US011707851B2

(12) United States Patent
Nakayama

(10) Patent No.: US 11,707,851 B2
(45) Date of Patent: Jul. 25, 2023

(54) ARM-SHAPED STRUCTURE BODY AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/935,510

(22) Filed: Jul. 22, 2020

(65) Prior Publication Data

US 2021/0060799 A1 Mar. 4, 2021

(30) Foreign Application Priority Data

Aug. 28, 2019 (JP) .............................. JP2019-155555
Jun. 16, 2020 (JP) .............................. JP2020-103596

(51) Int. Cl.
*B25J 18/00* (2006.01)
*B25J 9/00* (2006.01)

(52) U.S. Cl.
CPC ............. *B25J 18/00* (2013.01); *B25J 9/0009* (2013.01)

(58) Field of Classification Search
CPC . B25J 9/0009; B25J 9/0012; B25J 9/08; B25J 18/00; B25J 19/0066; B25J 19/0075; B25J 19/0029; B29C 63/34; B29C 63/26; B29C 64/153; F16B 17/00; F16B 17/004; F16B 17/006; F16B 17/008; F16B 21/20; F16B 2200/406; F16B 2200/50; F16B 2200/506; E02F 3/38; F16L 47/14; F16L 23/024; B33Y 80/00; B33Y 10/00

USPC ........................... 74/490.01, 490.05; 901/27
See application file for complete search history.

(56) References Cited

U.S. PATENT DOCUMENTS

| | | | | |
|---|---|---|---|---|
| 4,529,460 A | * | 7/1985 | Hasegawa | B21J 13/10 156/253 |
| 4,929,146 A | * | 5/1990 | Koster | B25J 9/042 16/223 |
| 5,079,055 A | * | 1/1992 | Doyle | B29C 70/24 411/427 |
| 9,895,839 B2 | * | 2/2018 | Ogawa | F16B 5/02 |
| 10,022,861 B1 | * | 7/2018 | He | B25J 9/126 |
| 2009/0114053 A1 | * | 5/2009 | Mikaelsson | B25J 18/00 74/490.05 |

(Continued)

FOREIGN PATENT DOCUMENTS

CN 105057631 A * 11/2015
CN 205032767 U * 2/2016
(Continued)

*Primary Examiner* — T. Scott Fix
(74) *Attorney, Agent, or Firm* — Maier & Maier, PLLC

(57) ABSTRACT

An arm-shaped structure body including an elongated first portion formed of resin, the first portion having a groove-shaped recessed section that opens in one direction intersecting a longitudinal direction thereof, and a second portion that is disposed so as to cover an opening of the recessed section and that is joined to the first portion in a state in which an elongated hollow section extending in the longitudinal direction is formed between the first portion and the second portion, where the second portion includes a pair of mounting sections that are disposed at both ends in the longitudinal direction, the pair of mounting sections being fixed to respective other parts constituting a robot.

26 Claims, 12 Drawing Sheets

(56) References Cited

U.S. PATENT DOCUMENTS

| | | | | |
|---|---|---|---|---|
| 2010/0224023 A1* | 9/2010 | Long | ............... | B25J 18/00 |
| | | | | 74/490.05 |
| 2010/0304097 A1* | 12/2010 | Nokleby | ............ | B29C 70/32 |
| | | | | 428/195.1 |
| 2012/0204670 A1* | 8/2012 | Ryland | ............. | B25J 9/08 |
| | | | | 74/490.03 |
| 2015/0040713 A1* | 2/2015 | Hirano | ............ | B25J 19/0029 |
| | | | | 74/490.02 |
| 2015/0153149 A1* | 6/2015 | Pettersson | ........ | G01B 7/008 |
| | | | | 33/503 |
| 2018/0169760 A1* | 6/2018 | Negishi | ............ | B33Y 80/00 |
| 2018/0290293 A1 | 10/2018 | Nakayama et al. | | |
| 2020/0096032 A1* | 3/2020 | Blaski | ............. | F16B 19/1072 |

FOREIGN PATENT DOCUMENTS

| | | | | |
|---|---|---|---|---|
| CN | 110394782 A | * | 11/2019 | |
| DE | 102017127261 A1 | * | 5/2018 | ............ B25J 18/00 |
| JP | H08-057791 A | | 3/1996 | |
| JP | H11-010687 A | | 1/1999 | |
| JP | 2001335676 A | | 12/2001 | |
| JP | 2009190353 A | * | 8/2009 | |
| JP | 2009195998 A | * | 9/2009 | |
| JP | 2010149166 A | * | 7/2010 | |
| JP | 2010179386 A | * | 8/2010 | |
| JP | 2011002069 A | | 1/2011 | |
| JP | 2011-140975 A | | 7/2011 | |
| JP | 2014018929 A | * | 2/2014 | ............ B25J 18/00 |
| JP | 2015-058463 A | | 3/2015 | |
| JP | 2018-167338 A | | 11/2018 | |
| JP | 2018-176337 A | | 11/2018 | |
| WO | WO-9631325 A1 | * | 10/1996 | ......... B25J 19/0012 |

\* cited by examiner

ARM-SHAPED STRUCTURE BODY AND ROBOT

CROSS-REFERENCE TO RELATED APPLICATIONS

This application is based on Japanese Patent Applications Nos. 2019-155555 and 2020-103596, the contents of which are incorporated herein by reference.

FIELD

This disclosure relates to an arm-shaped structure body and a robot.

BACKGROUND

There are well-known industrial robot arms that, in order to maintain strength while still achieving a lightweight design, include mounting interface sections at both ends of an elongated resin arm body (refer to, for example, Japanese Unexamined Patent Application, Publication No. 2018-176337).

SUMMARY

One aspect of this disclosure is directed to an arm-shaped structure body including: an elongated first portion formed of resin, said first portion having a groove-shaped recessed section that opens in one direction intersecting a longitudinal direction thereof; and a second portion that is disposed so as to cover the opening of the recessed section and that is joined to the first portion, wherein said second portion includes a pair of mounting sections that are disposed at both ends in the longitudinal direction and that are fixed to respective other parts constituting a robot.

DETAILED DESCRIPTION

An arm-shaped structure body 1 and a robot 100 according to one embodiment of this disclosure will now be described with reference to the drawings.

Figure 1:
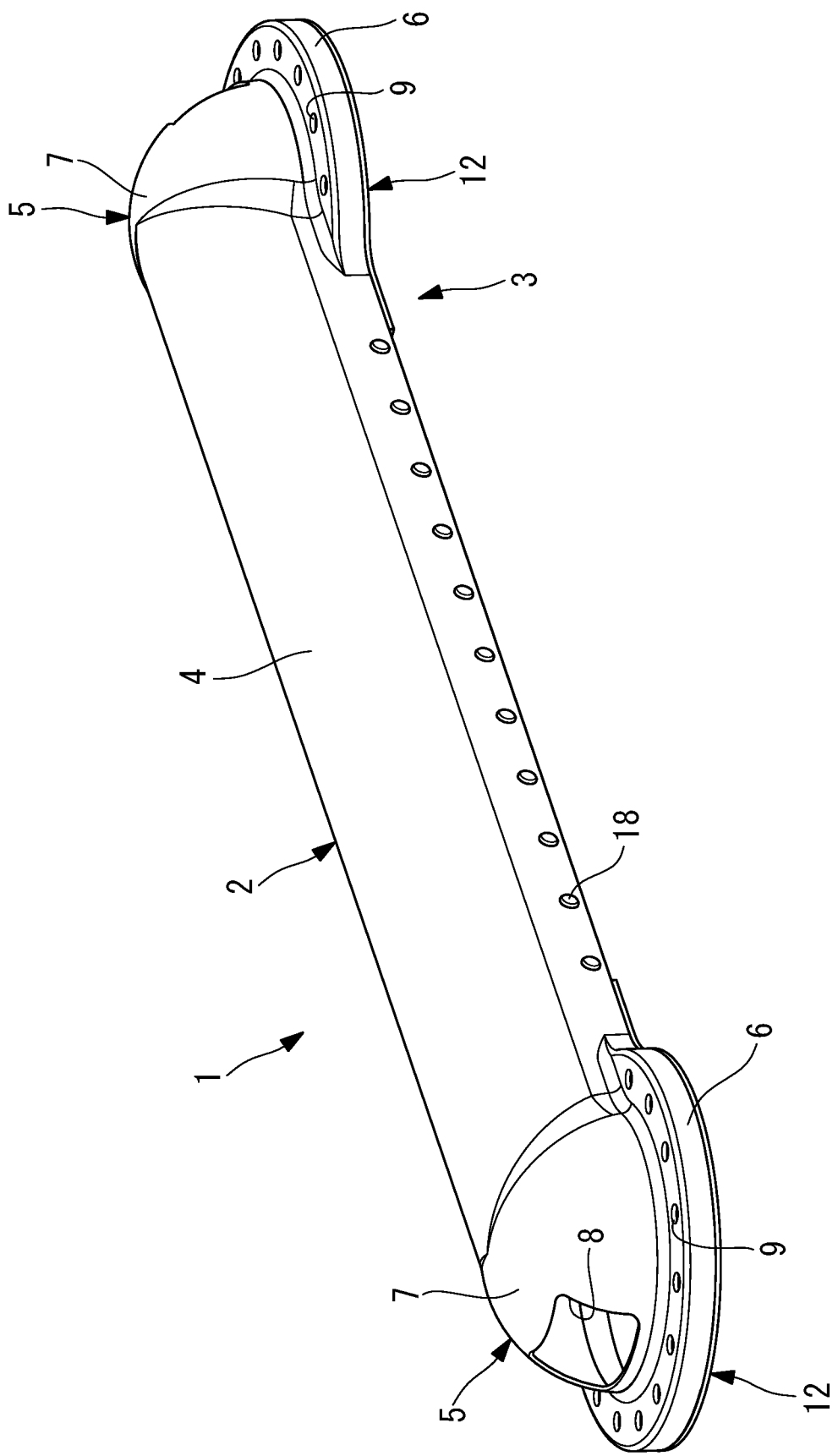
FIG. 1 is a perspective view showing an arm-shaped structure body according to one embodiment of this disclosure.

As shown in FIG. 1, the arm-shaped structure body 1 according to this embodiment is configured by joining a first portion 2 and a second portion 3 together and is, for example, a robot arm.

Figure 2:
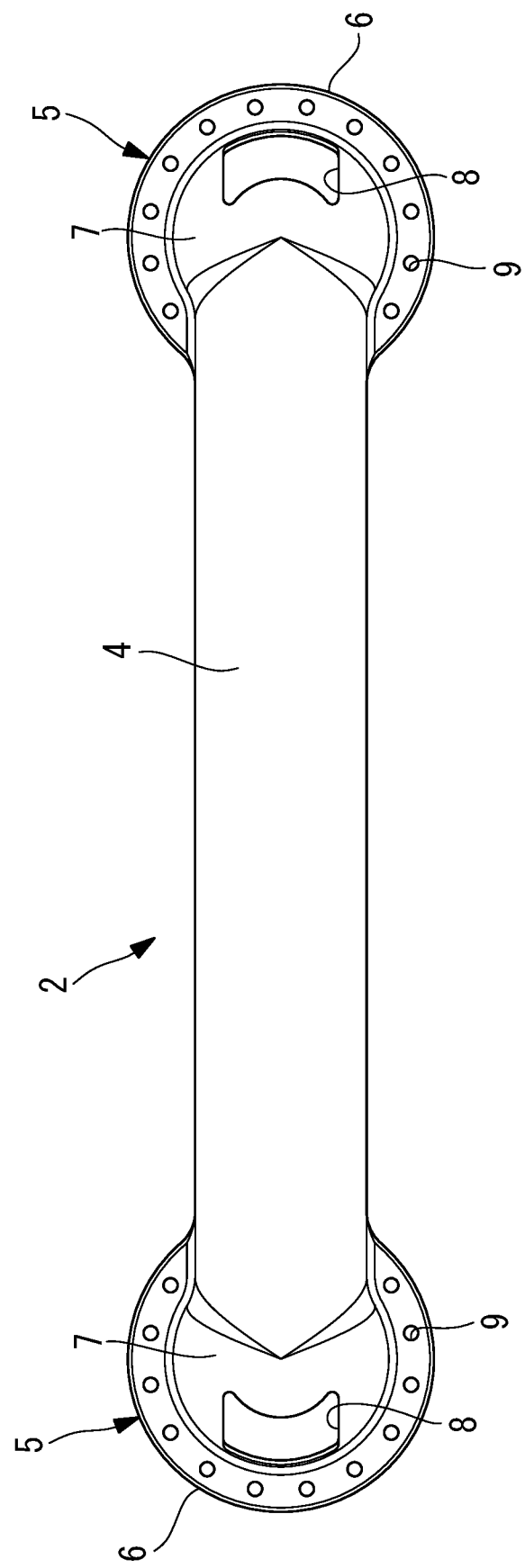
FIG. 2 is a front view showing a first portion of the arm-shaped structure body in FIG. 1.
Figure 3:
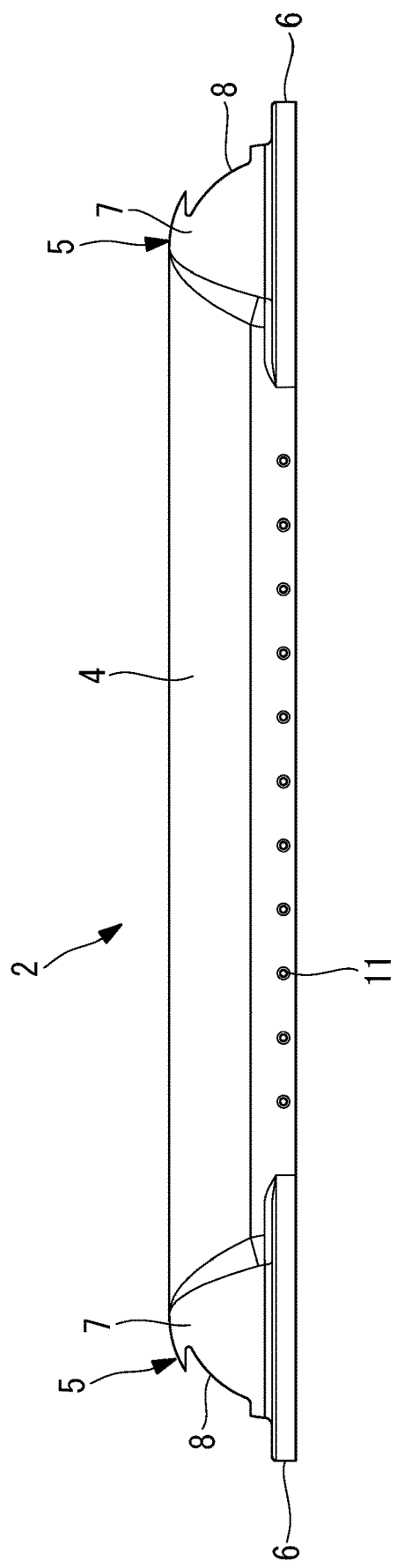
FIG. 3 is a side elevational view showing the first portion of the arm-shaped structure body in FIG. 1.
Figure 4:
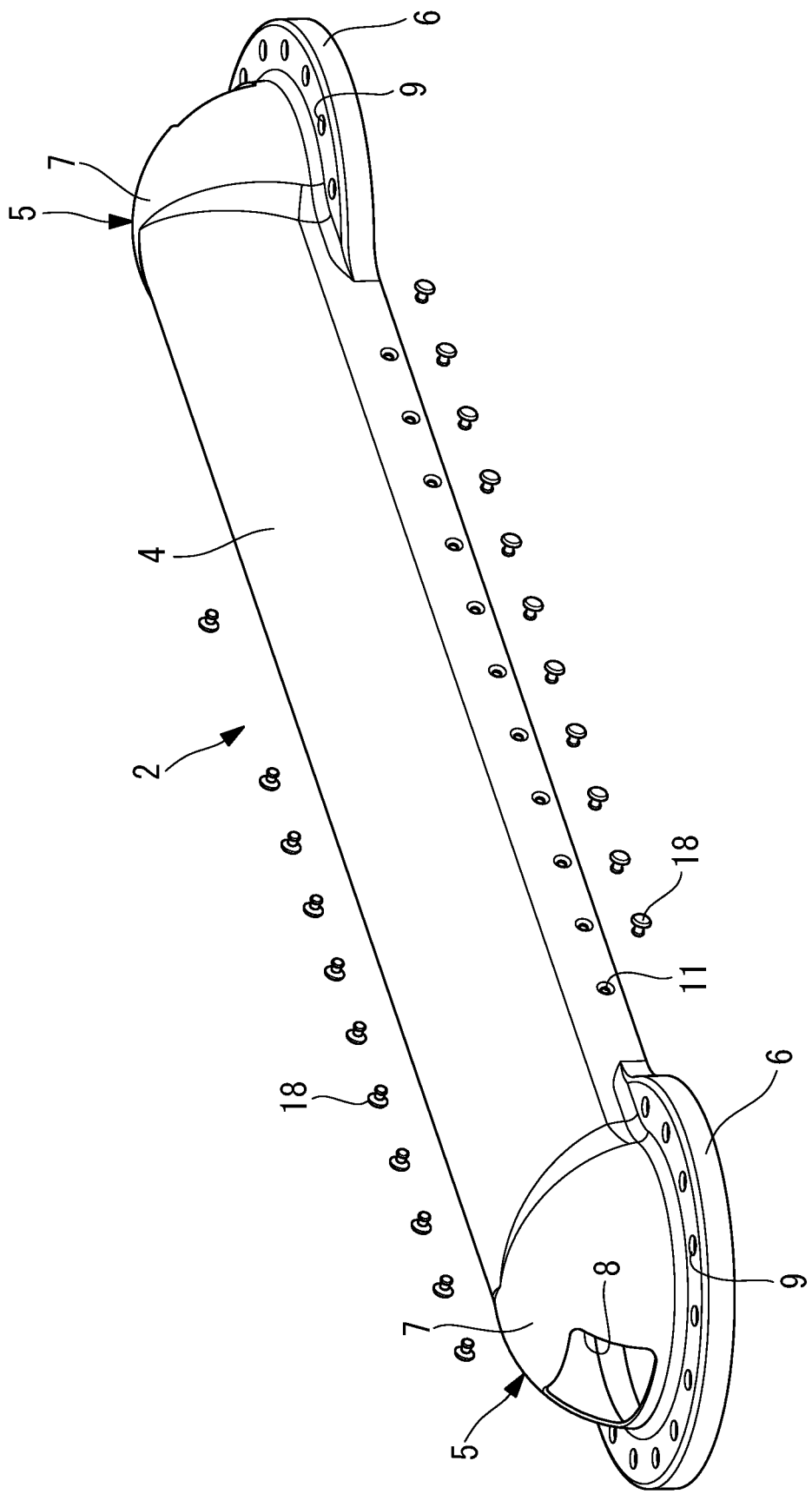
FIG. 4 is a perspective view of the front side of a body section of the first portion of the arm-shaped structure body in FIG. 1.
Figure 5:
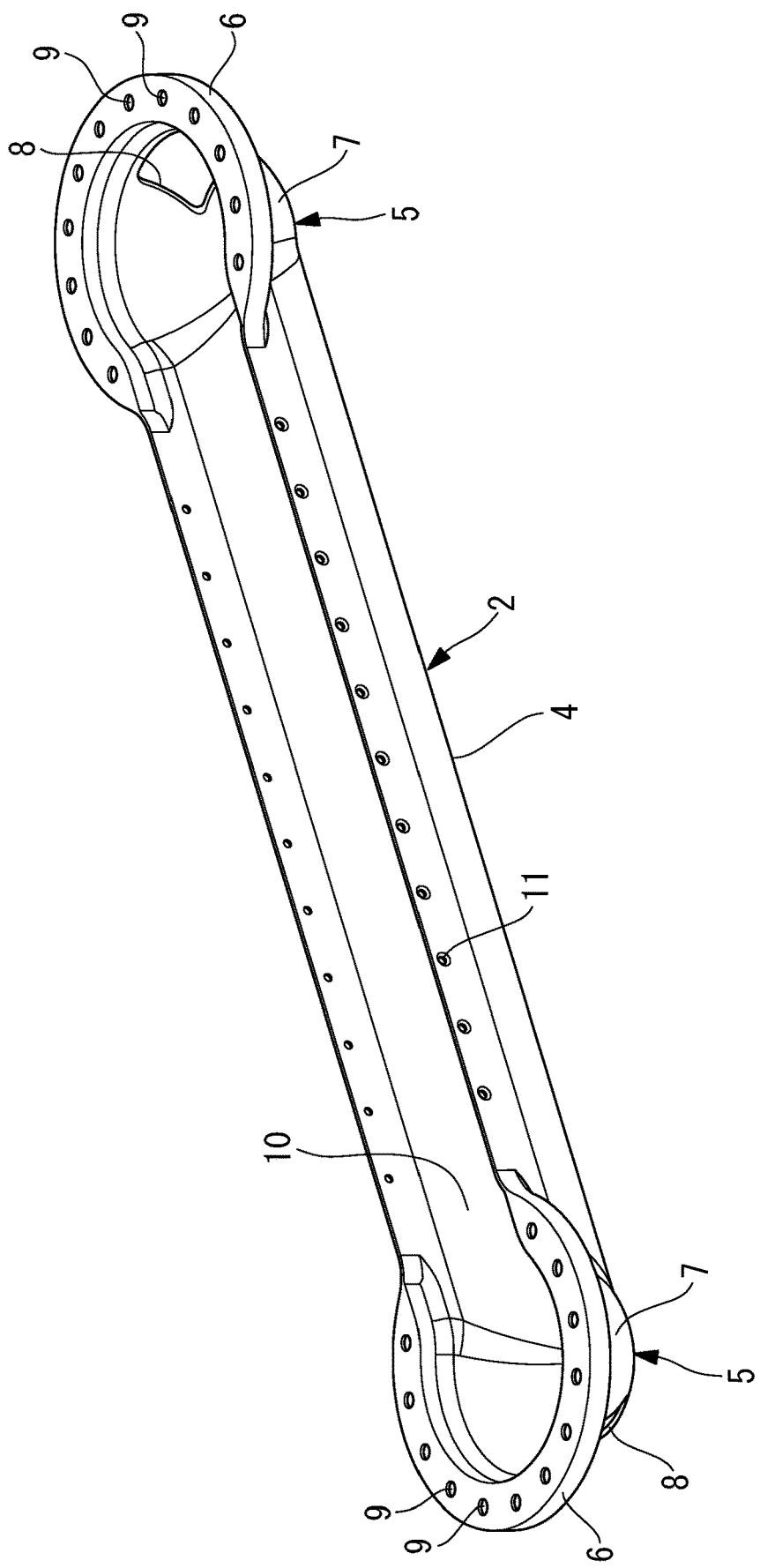
FIG. 5 is a perspective view of the rear side of the body section of the first portion of the arm-shaped structure body in FIG. 1.
Figure 6:
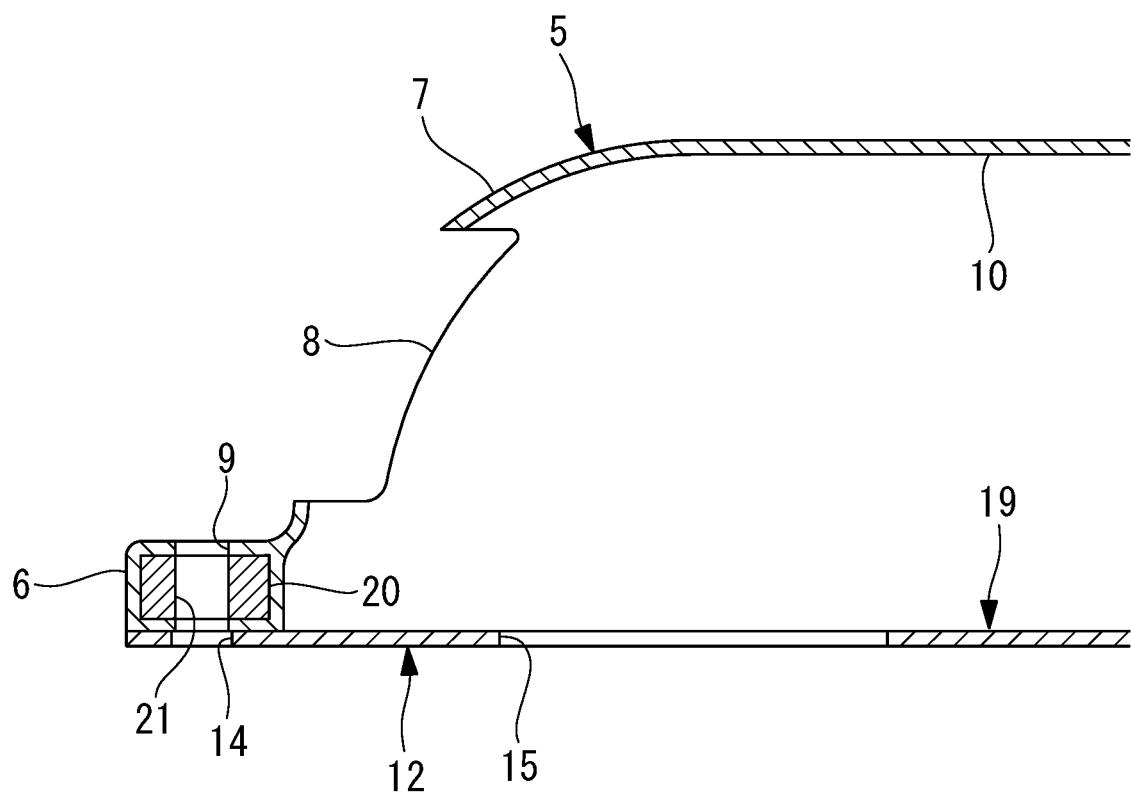
FIG. 6 is a partial longitudinal sectional view of the first portion of the arm-shaped structure body in FIG. 1.

As shown in FIGS. 2 and 3, the first portion 2 includes: a straight, elongated body section 4; and a pair of end sections 5 integrally provided at both ends of the body section 4. As shown in FIGS. 4 to 6, the body section 4 is formed in the shape of a straight gutter that has a substantially uniform wall thickness and whose transverse sections taken at any location thereof exhibit substantially uniform U-shapes that are open at one side thereof.

Each of the end sections 5 includes: a flange section 6, which has a shape formed by cutting out a circumferential portion of a ring plate; and a hollow, hemispherical connecting section 7 for connecting the body section 4 and the inner circumference of the flange section 6. The connecting section 7 also has a wall thickness substantially equivalent to that of the body section 4.

The connecting sections 7 include, in the vicinity of both ends of the first portion 2, opening sections 8 that pass through the connecting sections 7 in the plate thickness direction thereof and that make the interiors of the connecting sections 7 open to the outside.

As shown in FIGS. 2 and 3, each of the flange sections 6 includes a plurality of (12 in the example shown in FIG. 2) through-holes (second through-holes) 9 that are disposed on the same plane as the plane defining the edge of the opening of the body section 4, i.e., a plane parallel to the longitudinal axis of the body section 4, and that pass through the flange sections 6 in the plate thickness direction at locations spaced apart from one another in the circumferential direction.

Note that it is not always necessary that the plane surface of each of the flange sections 6 is parallel to the longitudinal axis of the body section 4. The plane surface of each of the flange sections 6 may be disposed so as to intersect with the longitudinal axis.

The first portion 2 is formed by press-molding a prepreg formed of a lightweight, high-strength resin, such as a carbon-fiber reinforced resin. As shown in FIG. 6, the flange section 6 is formed by embedding, into the resin, an arc-shaped metal flat plate (reinforcing member) 20 having a diameter slightly smaller than the outer diameter of the flange section 6. The metal flat plate 20 includes through-holes 21 at positions corresponding to the through-holes 9 in the flange section 6.

By doing so, the first portion 2 is formed in a shape so as to include a straight, groove-shaped recessed section 10 that is open at one side thereof and that continues from the connecting section 7 at one of the end sections 5 to the connecting section 7 at the other end section 5 via the body section 4.

In the vicinity of both ends of the opening in the body section 4 of the first portion 2, a plurality of (11 on each end in the example shown in FIG. 3) through-holes 11 are provided in a manner spaced apart from one another in the longitudinal direction. These through-holes 11 are used to fix rivets 18 (described later).

The second portion 3 is formed by punching a flat plate of metal, such as aluminum alloy, through press-machining and then by bending the flat plate.

Figure 7:
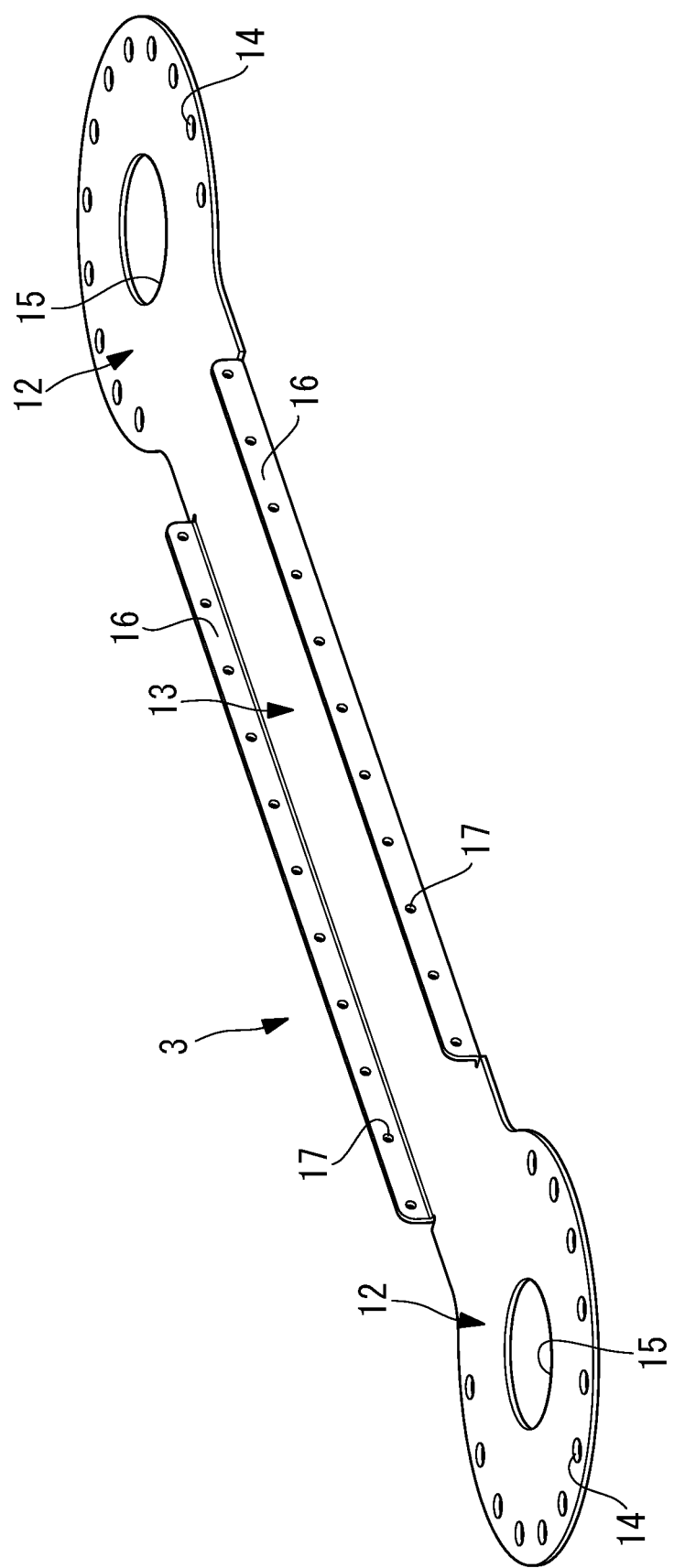
FIG. 7 is a perspective view showing a second portion of the arm-shaped structure body in FIG. 1.
Figure 8:
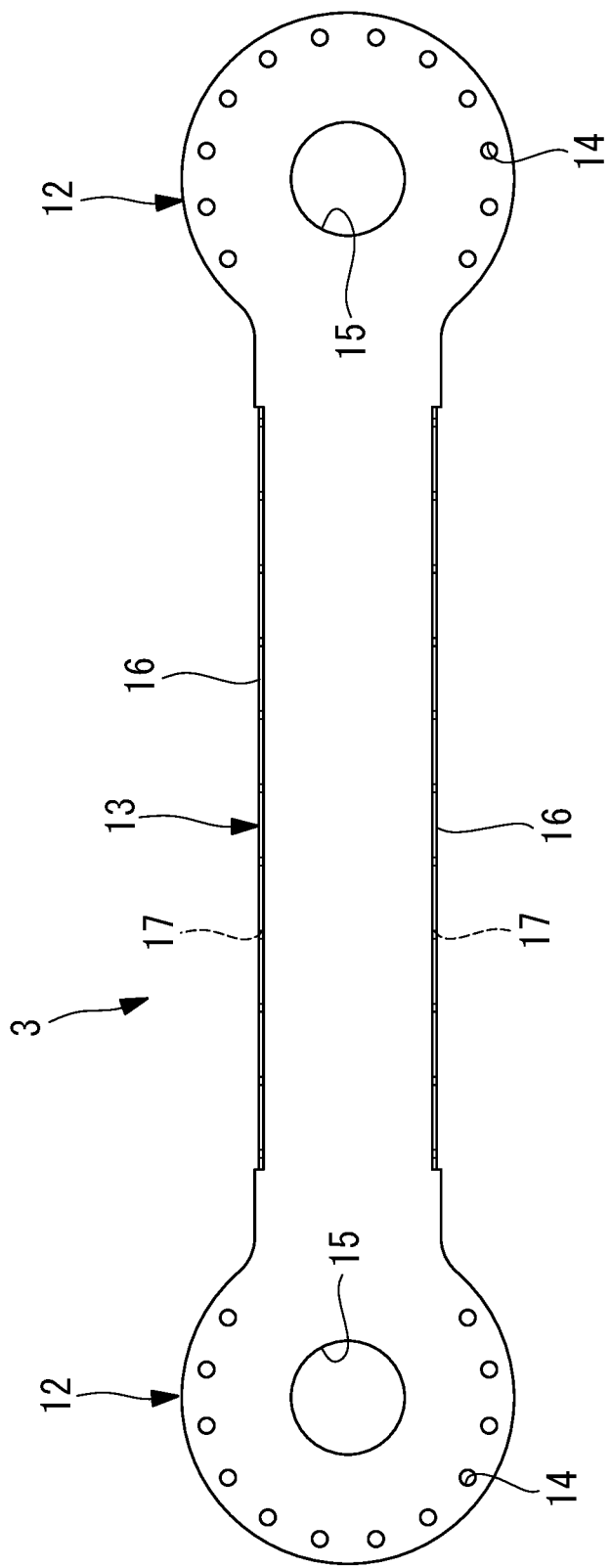
FIG. 8 is a front view showing the second portion of the arm-shaped structure body in FIG. 1.

As shown in FIGS. 7 and 8, the second portion 3 includes: a pair of disc-shaped mounting sections 12 disposed in a manner spaced apart from each other; and a band-plate-shaped linking section 13 for linking these mounting sections 12.

Each of the mounting sections 12 has an outer diameter substantially equivalent to the outer diameter of the flange section 6 of the first portion 2.

As shown in FIG. 8, each of the mounting sections 12 includes, in the vicinity of the outer circumference thereof, a plurality of (12 in the example shown in FIG. 8) through-holes (first through-holes) 14 that pass therethrough in the plate thickness direction and that are disposed in a manner spaced apart from one another in the circumferential direction. These through-holes 14 are positioned and sized so as to correspond to the through-holes 9 in the flange sections 6 of the first portion 2 when the second portion 3 is combined with the first portion 2. In addition, each of the mounting sections 12 includes, in the vicinity of the center thereof, a center hole 15 passing therethrough in the plate thickness direction.

The linking section 13 has a width substantially equivalent to the width of the opening of the recessed section 10 in the body section 4 of the first portion 2. The linking section 13 includes rib-shaped joint sections 16 formed by bending both widthwise ends thereof at right angles. As shown in FIG. 7, the joint sections 16 include a plurality of (11 on each in the example shown in FIG. 7) through-holes 17 in a manner spaced apart from one another in the longitudinal direction of the linking section 13. These through-holes 17 are positioned and sized so as to correspond to the through-holes 11 provided in the body section 4 of the first portion 2 when the second portion 3 is combined with the first portion 2. The rigidity of the second portion 3 is increased by forming the joint sections 16 in rib shapes.

In addition, in this embodiment, a notch is provided at the boundary between each of the joint sections 16 and the linking section 13 to make bending easier. However, because foreign matter may enter the interior of the arm-shaped structure body 1 via this notch, the gap caused by the notch may be filled with putty, a rubber bushing, or the like. By doing so, the sealability can be improved.

Figure 9:
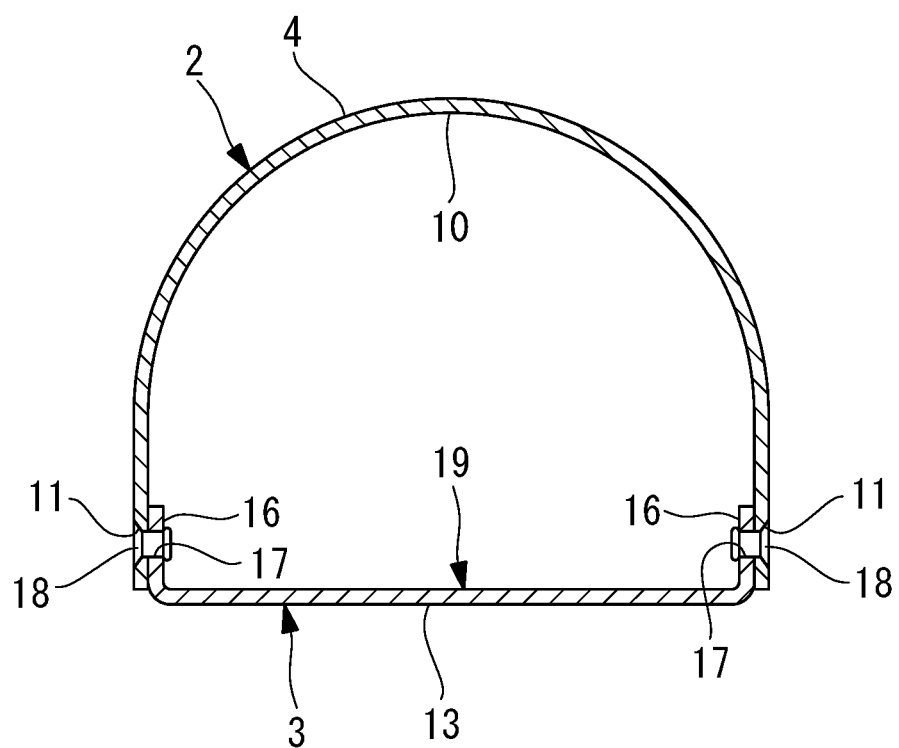
FIG. 9 is a transverse sectional view taken at the body section of the first portion of the arm-shaped structure body in FIG. 1.

As shown in FIGS. 1 and 9, the first portion 2 and the second portion 3 are joined to each other by laying the flange sections 6 over the mounting sections 12 in the plate thickness direction of the mounting sections 12 such that the pair of joint sections 16 of the linking section 13 of the second portion 3 are inserted into the recessed section 10 in the body section 4 of the first portion 2. Joining is performed by aligning the through-holes 17 provided in the joint sections 16 with the through-holes 11 provided in the body section 4, then by inserting the rivets 18, such as blind rivets, into the through-holes 11 and 17 from outside of the body section 4, as shown in FIG. 9, and finally by crimping the rivets 18 on the inner sides of the joint sections 16.

By doing so, the first portion 2 and the second portion 3 are integrally joined to each other by means of the rivets 18 at the position of the linking section 13 of the second portion 3. As a result of the opening in the recessed section 10 of the first portion 2 being covered with the second portion 3, the arm-shaped structure body 1 according to this embodiment configured in this manner has a hollow section 19 continuously extending from the inside of the connecting section 7 at one end to the inside of the connecting section 7 at the other end via the interior of the body section 4. The hollow section 19 is made open to the outside via the opening sections 8 provided in the connecting sections 7 of the first portion 2 and via the center holes 15 provided in the mounting sections 12 of the second portion 3.

The robot 100 including the arm-shaped structure body 1 with this structure according to this embodiment will be described below with reference to the drawings.

Figure 10:
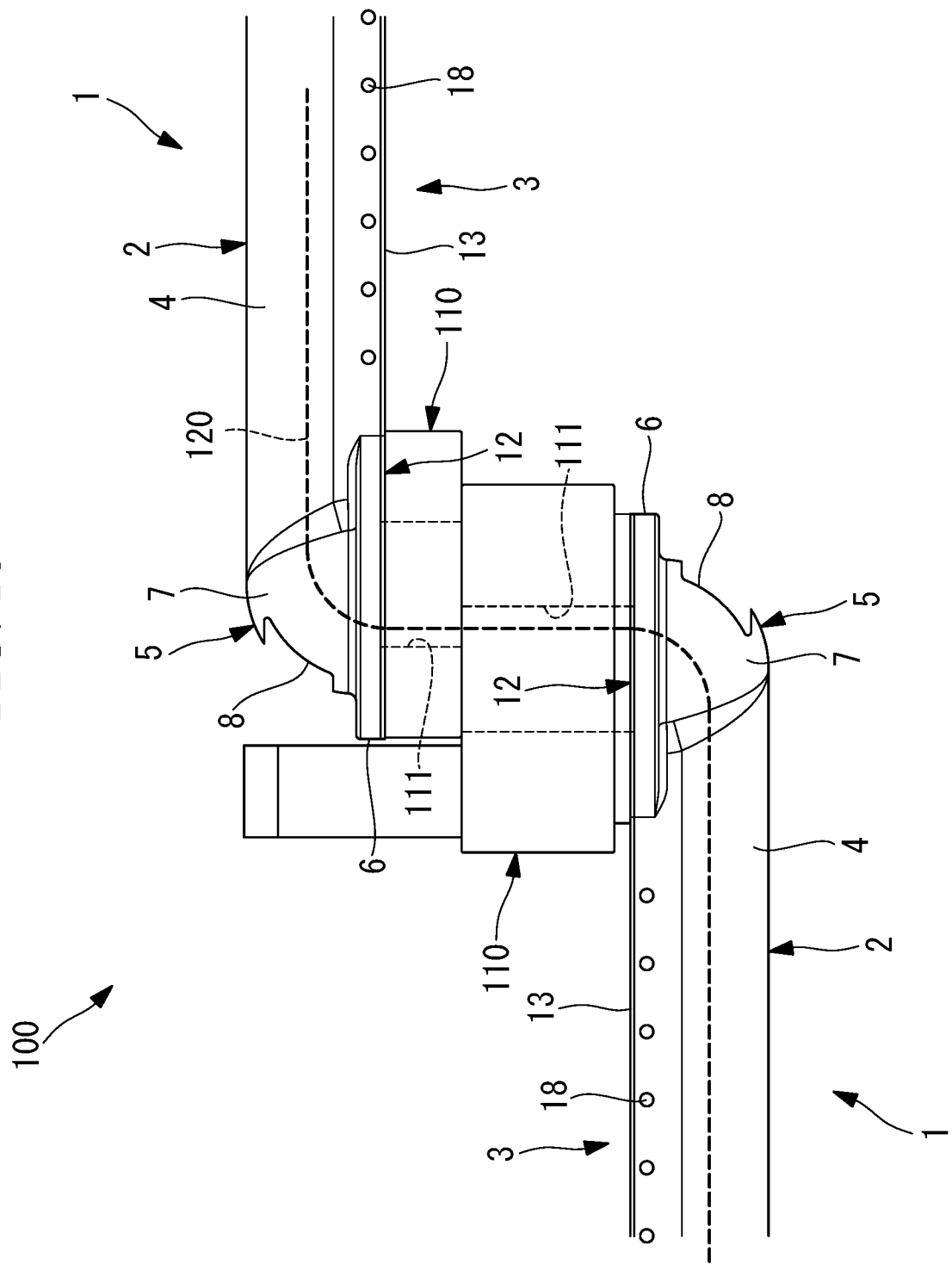
FIG. 10 is a side elevational view partially showing a robot according to one embodiment of this disclosure.

As shown in FIG. 10, the robot 100 according to this embodiment includes at least one of the above-described arm-shaped structure bodies 1.

As shown in, for example, FIG. 10, the arm-shaped structure body 1 is fixed directly to other parts, such as reducers 110, constituting the robot 100, at the mounting sections 12 on both ends thereof.

At this time, each of the flange sections 6 and the corresponding mounting section 12 that are stacked in the plate thickness direction are tightened together by means of bolts 30 (refer to FIG. 11) by passing the bolts 30 through the through-holes 9 and 14 in the flange section 6 and the mounting section 12 and then by tightening the bolts 30 to taps (not shown in the figure) of the reducer 110. By doing so, secure fixing of the arm-shaped structure body 1 to the reducers 110 is completed together with fixing of the flange sections 6 of the first portion 2 to the mounting sections 12 of the second portion 3.

A hollow reducer having a through-hole 111 at the center thereof is used as the reducer 110. By doing so, as shown in FIG. 10, a wire 120, such as a cable, can be routed such that the wire 120 is made to pass through the through-hole 111 in the reducer 110, is introduced into the hollow section 19 in the arm-shaped structure body 1 via the center hole 15 in one of the mounting sections 12, and is then taken out via the center hole 15 in the other mounting section 12. When the wire 120 is to be routed, routing can be made easier by handling the wire 120 with a hand that is inserted into the hollow section 19 via the opening section 8 provided in one of the connecting sections 7 of the first portion 2.

According to the arm-shaped structure body 1 of this embodiment, when the second portion 3 is assembled with the elongated first portion 2, which has the groove-shaped, longitudinally extending recessed section 10, a structure that has the hollow section 19 formed therein and both ends of which are covered is configured as a result of the recessed section 10 being covered. Because the recessed section 10 of the first portion 2 is open in one direction intersecting the longitudinal axis, the first portion 2 is relatively shallow, and hence, a mold for integral molding can be created easily.

Because the first portion 2 is manufactured by press-machining a highly rigid and lightweight prepreg of carbon-fiber reinforced resin, uniform wall thickness can be achieved easily, thereby making it possible to configure the highly rigid, lightweight arm-shaped structure body 1.

In addition, because the metal flat plate 20, serving as a metal reinforcing member having the through-holes 21, is embedded in each of the flange sections 6, the flange section 6 can endure the compression force of the bolts 30 when compressed as a result of the bolts 30 being tightened, and thus the bolts 30 can firmly tighten the flange section 6 and the mounting section 12 to, for example, the reducer 110. In addition, as the metal flat plate 20, a plurality of pipe-shaped metal spacers may be embedded in the flange section 6.

In addition, because the second portion 3 is formed of a metal flat plate, the second portion 3 can be easily manufactured by punching and bending a plate via press-machining, thus leading to a reduction in cost. In addition, the weight of the second portion 3 can be reduced by easily achieving a uniform wall thickness. In addition, because the two different parts fixed to the respective mounting sections 12 are disposed on the arm-shaped structure body 1 as a single part as a result of the mounting sections 12 being linked by means of the linking section 13, high dimensional accuracy for relative positions, parallelism, etc. can be easily achieved between the two different parts.

Note that although the second portion 3 is formed of a metal flat plate in this embodiment, the material of the second portion 3 is not limited to metal. For example, the material may be prepared by die-cast aluminum-alloy casting or may be formed of resin, such as carbon-fiber reinforced resin. The second portion 3 may be formed by insert molding in which a metal provided with a plurality of taps only in the joint sections 16 is embedded.

In addition, in this embodiment, the first portion 2 may be formed by injection-molding a fiber-reinforced thermoplastic resin.

In addition, the first portion 2 may be formed not in a plate shape but in a shape including a recessed section for forming the hollow section 19, as well as the recessed section 10 in the first portion 2.

Figure 11:
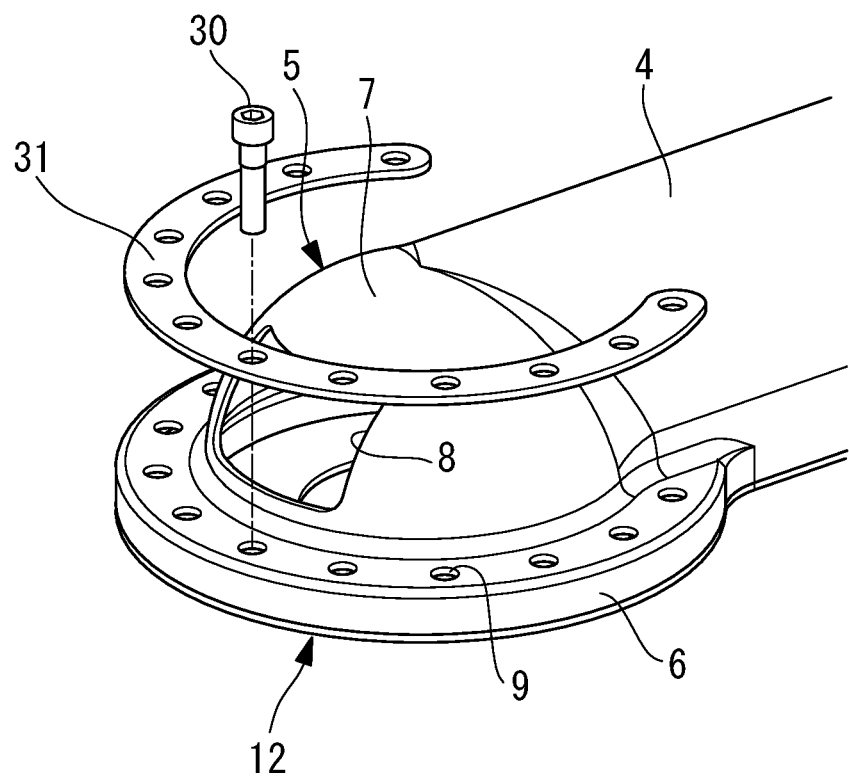
FIG. 11 is a partial perspective view of the first portion showing a modification of the arm-shaped structure body in FIG. 1.
Figure 12:
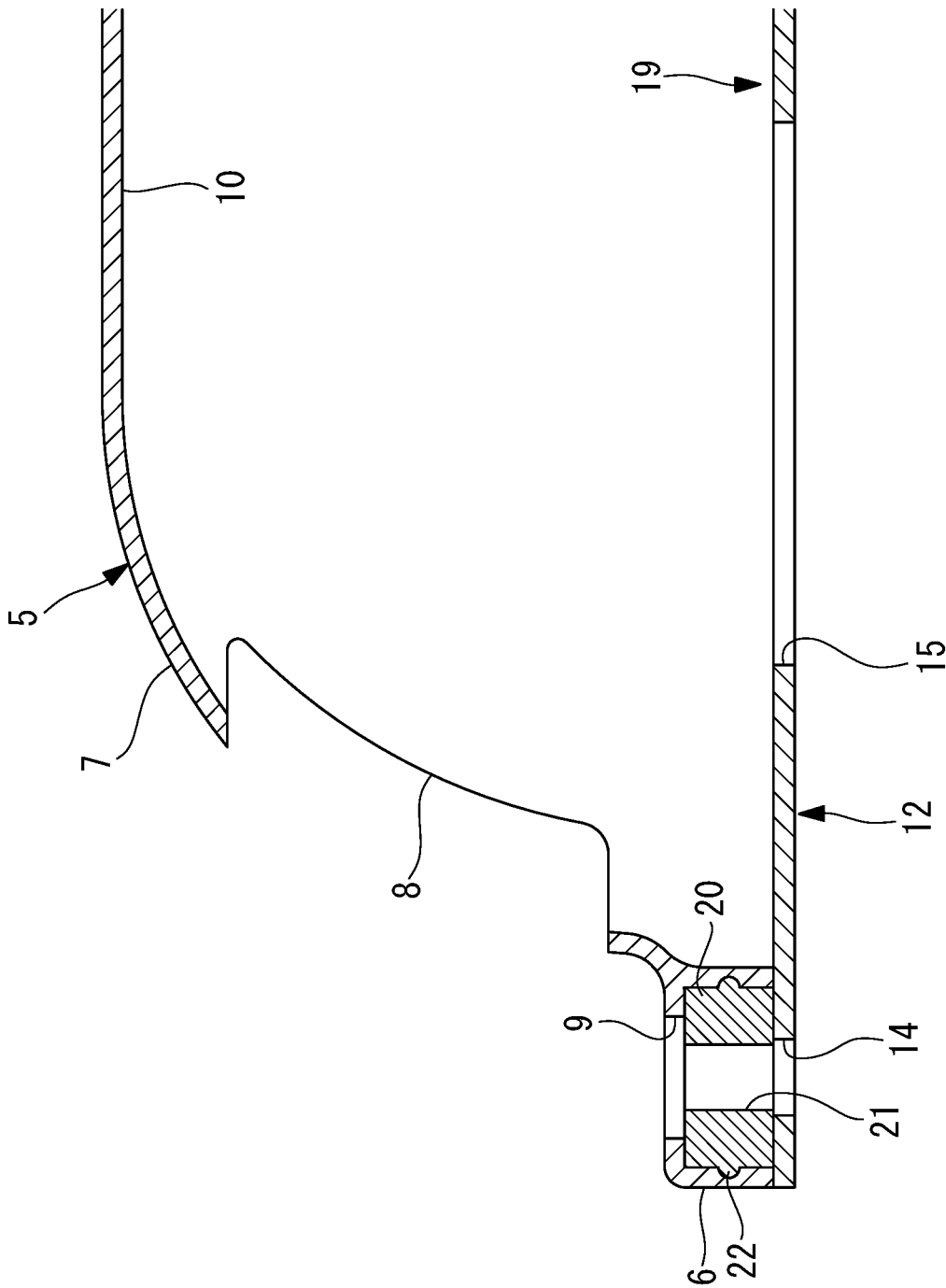
FIG. 12 is a partial longitudinal sectional view of the first portion showing another modification of the arm-shaped structure body in FIG. 1.

As shown in FIG. 12, the metal flat plate 20 may be formed in an annular shape having a constant thickness and may include a contact surface that is directly in contact with the mounting section 12 at one side in a thickness direction and an exposed surface that is exposed around the through-hole 9 at at least one portion of a surface of the other side in the thickness direction. The exposed surface serves as a seat for a bolt passing through the through-hole 9. In this case, the washer 31 as shown in FIG. 11 is not needed.

In this case, on an outer circumference surface of the metal flat plate 20, one or more protrusions 22 protruding in a radial direction may be provided at a portion in the circumference direction. A plurality of the protrusions 22 may be provided on the outer circumference surface of the metal flat plate 20 at intervals in the circumference direction. By so doing, it is possible to prevent the metal flat plate 20 from slipping out of the flange section 6 and from rotating with respect to the flange section 6.

Instead of the annular metal flat plate 20, the metal flat plate 20 having a noncircular cross section, such as a polygonal cross section, may be employed. In this case, the protrusions described above are not needed.

In addition, although this embodiment has been described by way of an example where the first portion 2 and the second portion 3 are joined by means of the rivets 18, instead of this, the first portion 2 and the second portion 3 may be joined by arbitrary joining means such as bolts and nuts. In the case where both the first portion 2 and the second portion 3 are formed of resin, an adhesive may be employed as the joining means. The rivets 18 and the adhesive may be used in combination.

In addition, this embodiment may include a cover member that is mounted on each of the end sections 5 to allow the opening section 8 to be opened and closed.

In addition, this embodiment may include a stainless-steel, horseshoe-shaped washer 31 inserted between the bolts 30 and each of the flange sections 6, as shown in FIG. 11. By doing so, when the bolts 30 are made to pass through the through-holes 9 and 14 and fixed, it is possible to achieve a large bolt axial force while still preventing, as a result of the bolts 30 being fixed to the flange section 6 with the washer 31 interposed therebetween, the seat surfaces around the through-holes 9 in the flange section 6 from collapsing. This prevents the bolts 30 from being loosened, etc.

In addition, in this embodiment, at least a portion of the outer peripheral surface of the arm-shaped structure body 1 may be coated with nonflammable paint.

The nonflammable paint preferably exhibits nonflammability where the flame duration is ten seconds or less and the paint is not burned to an extent of 127 mm or more when the paint is disposed vertically relative to fire and is set on the fire for 10 seconds. More preferably, when test pieces (($125\pm5$)×($13\pm0.5$)×t mm) of the paint are mounted directly on clamps and the steps of bringing a 20-mm flame into contact with the test pieces and holding the flame for ten seconds are performed twice, the test pieces should satisfy the following conditions: the combustion time of each of the test pieces is ten seconds or less; the total combustion time of five of the test pieces is 50 seconds or less; the total of the combustion time and the glowing time of each of the test pieces is 30 seconds or less; combustion does not reach the clamps; and cotton disposed below the test pieces does not catch fire.

In addition, a resin material having nonflammability should preferably exhibit the same performance as the nonflammable paint.

In addition, even if the nonflammable paint and the resin material having nonflammability fail to satisfy the above-described conditions and exhibit nonflammability performance slightly lower than required, the combustion resistance of the arm-shaped structure body 1 can be improved by coating the outer surface of the arm-shaped structure body 1 with such nonflammable paint.

The invention claimed is:

1. An arm-shaped structure body comprising:
a first portion formed of resin, the first portion comprising:
a U-shaped body with an opening between two ends,
first mounting sections disposed at the two ends of the first portion comprising a first plurality of through-holes,
two recessed openings formed at each of the two ends of the first portion, wherein the two recessed openings are aligned along a central axis of the U-shaped body section, and
two hemispherical sections that connect each of the first mounting sections to the U-shaped body, wherein each hemispherical section has a respective opening section in a plate thickness direction; and
a second portion formed unitarily of a metal plate comprising a linking section that is disposed so as to cover the opening between the two ends of the U-shaped body and a pair of mounting sections comprising a second plurality of through-holes, each of which corresponds to each of the first plurality of through-holes on the first mounting sections, wherein the second plurality of through-holes pass therethrough in a plate thickness direction.

2. The arm-shaped structure body according to claim 1, further comprising:
an elongated hollow section is formed in a longitudinal direction between the first portion and the second portion.

3. The arm-shaped structure body according to claim 1, wherein the first portion and the second portion are joined via a third plurality of through-holes along the linking section which respectively correspond to a fourth plurality of through-holes along the U-shaped body section.

4. The arm-shaped structure body according to claim 2, wherein each mounting section of the pair of mounting sections is provided with, at a center thereof, a center hole passing therethrough in the plate thickness direction.

5. The arm-shaped structure body according to claim 1, wherein the first mounting sections, in a state in which the first portion is joined to the second portion, are placed over the pair of mounting sections in the plate thickness direction at vicinities of outer circumferences of the pair of mounting sections.

6. The arm-shaped structure body according to claim 5, wherein a metal flat plate, configured to act as a metal reinforcing member, is embedded in each of the first mounting sections.

7. The arm-shaped structure body according to claim 6, wherein each metal flat plate comprises a contact surface that is in contact with the second portion, and an exposed surface where at least one portion of a surface opposite to the contact surface is exposed around a corresponding metal flat plate.

8. The arm-shaped structure body according to claim 2, wherein the first mounting sections, in a state in which the first portion is joined to the second portion, are placed over the pair of mounting sections in the plate thickness direction at vicinities of outer circumferences of the pair of mounting sections.

9. The arm-shaped structure body according to claim 1, wherein the first portion is formed of a carbon-fiber reinforced resin.

10. The arm-shaped structure body according to claim 5, further comprising:
a plurality of bolts that are configured to be inserted into the first plurality of through-holes; and
a single washer that is disposed between the plurality of bolts and each of the first mounting sections where the plurality of bolts are inserted into the first plurality of through-holes.

11. The arm-shaped structure body according to claim 1, wherein at least a portion of an outer peripheral surface of the arm-shaped structure body is coated with a nonflammable paint that exhibits a flame duration time of ten seconds or less and that does not burn to an extent of 127 mm or more when the paint is disposed vertically relative to fire and set on the fire for ten seconds.

12. The arm-shaped structure body according to claim 1, wherein the first portion is formed of a resin material having nonflammability, the resin material exhibiting a flame duration time of ten seconds or less and not burning to an extent of 127 mm or more when the resin material is disposed vertically relative to fire and set on the fire for ten seconds.

13. A robot comprising:
a robot arm in a form of an arm-shaped structure body comprising:
a first portion formed of resin, the first portion having a U-shaped body section that continuously opens from one end of the first portion through another end of the first portion in one direction intersecting a longitudinal direction thereof, first mounting sections disposed at the two ends of the first portion comprising a plurality of first through-holes, a pair of recessed openings aligned along a central axis of the U shaped body section, and two hemispherical sections that connect each of the first mounting sections to the U-shaped body, wherein each hemispherical section has a respective opening section in a plate thickness direction; and
a second portion that is disposed so as to cover the continuous opening of the U-shaped body section and that is joined to the first portion, wherein the second portion comprises
a pair of mounting sections that are disposed at both ends in the longitudinal direction, wherein the pair of mounting sections comprises a second plurality of through-holes, each of which corresponds to each of the first plurality of through-holes on the first mounting sections, wherein the second plurality of through-holes pass therethrough in a plate thickness direction, the pair of mounting sections being fixed to respective other parts of the robot, and a linking section that connects the pair of mounting sections; and
a single washer that is disposed between a plurality of bolts and each of the first mounting sections, wherein the plurality of bolts are inserted into the first plurality of through-holes, wherein the first mounting sections, in a state in which the first portion is joined to the second portion, are placed over the pair of mounting sections in the plate thickness direction at vicinities of outer circumferences of the pair of mounting sections.

14. An arm-shaped member comprising:
a first portion formed of resin, the first portion comprising:
a U-shaped cross-sectional body section with an opening between two ends, the U-shaped cross-sectional body section having a U-shaped cross section perpendicular to a longitudinal direction of the arm-shaped member, and
first mounting sections disposed at the two ends comprising a first plurality of through-holes passing therethrough in a plate thickness direction and a second portion formed unitarily from a metal plate comprising:
a linking section that is disposed so as to cover the opening of the U-shaped cross-sectional body section, and
a pair of second mounting sections comprising a second plurality of through-holes each of which corresponds to each of the first plurality of through-holes on the first mounting sections, wherein the second plurality of through-holes pass therethrough in a plate thickness direction.

15. The arm-shaped member of claim 14, further comprising
a plurality of bolts penetrating the first plurality of through-holes and second plurality of through-holes, fixing the first portion together with the second portion.

16. The arm-shaped member of claim 14, wherein an elongated hollow section is formed within the U-shaped cross-sectional body section, extending in the longitudinal direction between the first portion and the second portion.

17. The arm-shaped member of claim 14, wherein the first portion and the second portion are joined at a plurality of overlapping through-holes placed along a circumference of the U-shaped cross-sectional body section which overlaps a circumference of the linking section.

18. The arm-shaped member of claim 14, further comprising
two openings formed at each of the two ends of the first portion, wherein each of the two openings allows access to a hollow interior of the U-shaped cross-sectional body section of the first portion.

19. The arm-shaped member of claim 14, wherein metal reinforcing members for reinforcing the first through-holes are embedded in the pair of first mounting sections.

20. The arm-shaped member of claim 19, wherein each of the metal reinforcing members comprises a contact surface that is in contact with the second portion, and an exposed surface where at least one portion of a surface opposite to the contact surface is exposed around the second through-holes.

21. The arm-shaped member of claim 14, wherein the first portion is formed of a carbon-fiber reinforced resin.

22. The arm-shaped member of claim 15, further comprising: at least one washer that is disposed between the bolts and each of the mounting sections where the bolts are inserted into the first plurality of through-holes.

23. The arm-shaped member of claim 14, wherein at least a portion of an outer peripheral surface of the arm-shaped member is coated with a nonflammable paint that exhibits a flame duration time of ten seconds or less and that does not burn to an extent of 127 mm or more when the paint is disposed vertically relative to fire and set on the fire for ten seconds.

24. The arm-shaped member of claim 14, wherein the first portion is formed of a resin material having nonflammability, the resin material exhibiting a flame duration time of ten seconds or less and not burning to an extent of 127 mm or more when the resin material is disposed vertically relative to fire and set on the fire for ten seconds.

25. The arm-shaped member of claim 14, wherein each of the first mounting sections of the first portion comprises a respective flange.

26. The arm-shaped member of claim 14, wherein each of the second mounting sections is provided with, at a center thereof, a center hole passing therethrough in the plate thickness direction.

* * * * *